(12) United States Patent
Dice (10) Patent No.: US 8,707,006 B2
(45) Date of Patent: Apr. 22, 2014

(54) CACHE INDEX COLORING FOR VIRTUAL-ADDRESS DYNAMIC ALLOCATORS

(75) Inventor: David Dice, Foxboro, MA (US)

(73) Assignee: Oracle International Corporation, Redwood City, CA (US)

( * ) Notice: Subject to any disclaimer, the term of this patent is extended or adjusted under 35 U.S.C. 154(b) by 868 days.

(21) Appl. No.: 12/899,493

(22) Filed: Oct. 6, 2010

(65) Prior Publication Data

US 2012/0089803 A1    Apr. 12, 2012

(51) Int. Cl.
G06F 12/00    (2006.01)
G06F 13/00    (2006.01)
G06F 13/28    (2006.01)

(52) U.S. Cl.
USPC ......................................................... 711/171

(58) Field of Classification Search
USPC ......................................................... 711/171
See application file for complete search history.

(56) References Cited

PUBLICATIONS

Calder, B., et al. "Cache-Conscious Data Placement," Eighth International Conference on Architectural Support for Programming Languages and Operating Systems (ASPLOS), Oct. 1998, 11 pages.
Chilimbi, Trishul. "Cache-Conscious Data Structures—Design and Implementation," Ph.D. dissertation, University of Wisconsin-Madison, Aug. 1999, 132 pages.
Chilimbi, T., et al. "Cache-Conscious Structure Definition," Proceedings of the ACM SIGPLAN '99 Conference on Programming Language Design and Implementation (PLDI), May 1999, 12 pages.
Chilimbi, T., et al. "Cache-Conscious Structure Layout," Proceedings of the ACM SIGPLAN '99 Conference on Programming Language Design and Implementation (PLDI), May 1999, 12 pages.
Chilimbi, T., et al. "Making Pointer-Based Data Structures Cache Conscious," IEEE Computer, vol. 33, Dec. 2000, 8 pages.
Chilimbi, T., et al. "Cache-Conscious Data Structures," www.research.microsoft.com/en-us/um/people/trishulc/papers/ccds.pdf. Aug. 1999, 17 pages.
Berger, E. D., et al. "Hoard: A Scalable Memory Allocator for Multithreaded Applications," ACM SIGPLAN, vol. 35, Issue 11, Nov. 2000, 12 pages.
Dice, D., et al. "Mostly Lock-Free Malloc," Proceedings of the 3rd International Symposium on Memory Management (ISMM '02), Jun. 2002, 12 pages.
Bonwick, J., et al. "Magazines and Vmem: Extending the Slab Allocator to Many CPUs and Arbitrary Resources," Proceedings of the 2001 USENIX Annual Technical Conference, Jun. 2001, 20 pages.

*Primary Examiner* — Matthew Bradley
*Assistant Examiner* — Craig Goldschmidt
(74) *Attorney, Agent, or Firm* — Osha Liang LLP (57) ABSTRACT

A method for managing a memory, including obtaining a number of indices and a cache line size of a cache memory, computing a cache page size by multiplying the number of indices by the cache line size, calculating a greatest common denominator (GCD) of the cache page size and a first size class, incrementing, in response to the GCD of the cache page size and the first size class exceeding the cache line size, the first size class to generate an updated first size class, calculating a GCD of the cache page size and the updated first size class, creating, in response to the GCD of the cache page size and the updated first size class being less than the cache line size, a first superblock in the memory including a first plurality of blocks of the updated first size class, and creating a second superblock in the memory.

20 Claims, 7 Drawing Sheets

CACHE INDEX COLORING FOR VIRTUAL-ADDRESS DYNAMIC ALLOCATORS

BACKGROUND

A cache is memory used by a processor of a computer to reduce the average time to access data. Cache memory is smaller and faster than main memory. Cache memory stores copies of data from the most frequently used main memory locations. When cache memory is accessed frequently, the average total memory access latency will be closer to the cache memory latency than to the main memory latency. Typically, when a processor needs to read from and/or write to a location in main memory, it first determines if a copy of that data is available in the cache. If so, the processor reads from and/or writes to the cache, which is much faster than reading from and/or writing to main memory. There are typically at least three independent cache types—an instruction cache used to speed up fetching of executable instructions, a data cache used to speed up fetching and storing of data, and a translation lookaside buffer (TLB) used to speed up virtual-to-physical address translation for both executable instructions and data. Many computers use multiple levels of caches (i.e. small fast caches followed by larger slower caches). Multi-level caches typically function by checking the smallest level 1 (L1) cache first. If data is found in the L1 cache, then the data is accessed from this high speed memory. If the L1 cache misses, the next larger cache (L2) is checked. This process continues through the various cache levels, until main memory is checked.

SUMMARY

In general, in one aspect, the invention relates to a method for managing a memory, comprising obtaining a first size class, obtaining a number of indices and a cache line size of a cache memory, computing a cache page size by multiplying the number of indices by the cache line size, calculating a greatest common denominator (GCD) of the cache page size and the first size class, incrementing, in response to the GCD of the cache page size and the first size class exceeding the cache line size, the first size class to generate an updated first size class, calculating a GCD of the cache page size and the updated first size class, creating, in response to the GCD of the cache page size and the updated first size class being less than the cache line size, a first superblock in the memory comprising a first plurality of blocks of the updated first size class, creating a second superblock in the memory, receiving a memory allocation request (MAR) for an object having a size, mapping, in response to the MAR, the size of the object to the updated first size class, identifying, in response to mapping the size of the object to the updated first size class, a free block of the first plurality of blocks in the first superblock, and returning, in the response to the memory allocation request, an address of the free block.

In general, in one aspect, the invention relates to a system for managing a memory, comprising a processor; a cache memory executing on the processor and comprising a number of indices and a cache line size; a local heap in a main memory space comprising a plurality of superblocks of a first size class; and a cache index aware allocator in the main memory space, executing on the processor, and configured to obtain the first size class, obtain the number of indices and the cache line size of the cache memory, compute a cache page size by multiplying the number of indices by the cache line size, calculate a greatest common denominator (GCD) of the cache page size and the first size class, increment, in response to the GCD of the cache page size and the first size class exceeding the cache line size, the first size class to generate an updated first size class, calculate a GCD of the cache page size and the updated first size class, create, in response to the GCD of the cache page size and the updated first size class being less than the cache line size, a first superblock in the local heap comprising a first plurality of blocks of the updated first size class, create a second superblock in the local heap, receive a memory allocation request (MAR) for an object having a size, map, in response to the MAR, the size of the object to the updated first size class, identify, in response to mapping the size of the object to the updated first size class, a free block of the first plurality of blocks in the first superblock, and return, in the response to the memory allocation request, an address of the free block.

In general, in one aspect, the invention relates to a computer readable medium storing instruction for managing a memory, the instructions executable on a processor and comprising functionality for obtaining a first size class, obtaining a number of indices and a cache line size of a cache memory, computing a cache page size by multiplying the number of indices by the cache line size, calculating a greatest common denominator (GCD) of the cache page size and the first size class, incrementing, in response to the GCD of the cache page size and the first size class exceeding the cache line size, the first size class to generate an updated first size class, calculating a GCD of the cache page size and the updated first size class, creating, in response to the GCD of the cache page size and the updated first size class being less than the cache line size, a first superblock in the memory comprising a first plurality of blocks of the updated first size class, creating a second superblock in the memory, receiving a memory allocation request (MAR) for an object having a size, mapping, in response to the MAR, the size of the object to the updated first size class, identifying, in response to mapping the size of the object to the updated first size class, a free block of the first plurality of blocks in the first superblock, and returning, in the response to the memory allocation request, an address of the free block.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing memory. In general, embodiments of the invention provide a system and method for allocating memory based on cache indexes. In general, embodiments of the invention provide a system and method for creating superblocks in memory.

Figure 1:
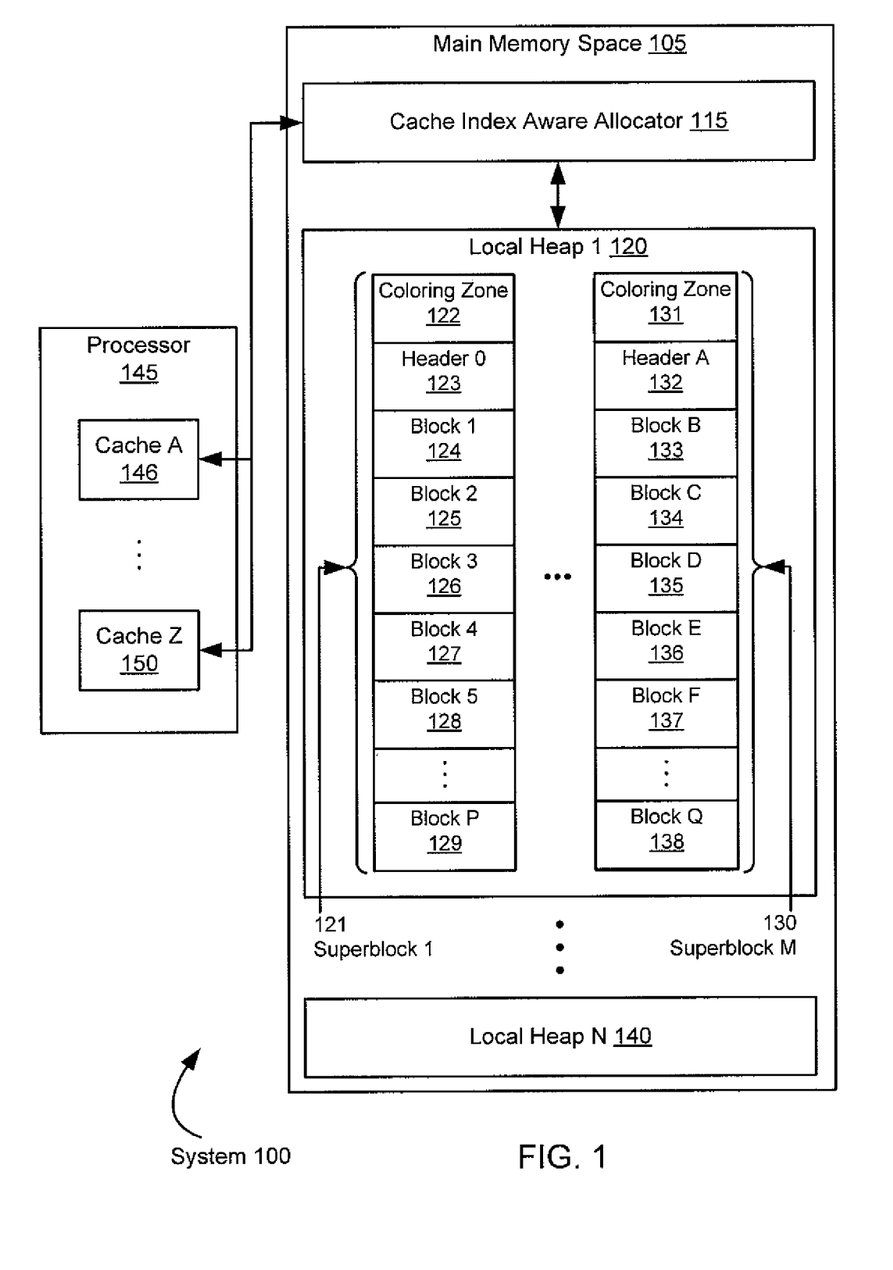
FIG. 1 shows a system in accordance with one or more embodiments of the invention.

FIG. 1 shows system (100) in accordance with one or more embodiments of the invention. As shown in FIG. 1, system (100) includes components such as main memory space (105) and processor (145). Processor (145) contains multiple caches, such as cache A (146) and cache Z (150). Main memory space (105) contains cache index aware allocator (115), and multiple local heaps, including local heap 1 (120) and local heap N (140). Local heap 1 (120) contains various superblocks, including superblock 1 (121) and superblock M (130). Superblock 1 (121) contains coloring zone (122), header 0 (123), and various blocks including blocks 1 through P (i.e. (124)-(129)). Superblock M (130) contains coloring zone (131), header A (132), and various blocks including blocks B through Q (i.e. (133)-(138)). These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet, a wide area network (WAN), or a local area network (LAN)), with wired and/or wireless segments. In one or more embodiments of the invention, there may be various cache index aware allocators, local heaps, and superblocks running on a device, as well as more than one processor and cache interfacing with those components.

In one or more embodiments of the invention, cache A (146) is configured to store data on processor (145). Cache A (146) and cache Z (150) are cache memories that store copies of data from the most frequently used main memory locations of superblock 1 (121) and superblock M (130) in local heap 1 (120). Caches A (146) and Z (150) may be L1 caches. Caches A (146) and Z (150) may include cache lines (i.e. entries containing data in a cache), cache indices (i.e. a mechanism for identifying each cache lines in a cache), and cache pages (i.e. a full set of cache lines and their corresponding cache indices). Those skilled in the art will appreciate that there may be numerous caches on processor (145), and that these caches may interface with numerous local heaps containing various superblocks.

In one or more embodiments of the invention, main memory space (105) is configured to store various components of system (100) as well as other data. Main memory space (105) may be directly accessible to a central processing unit (CPU) or processor (145). The function of main memory space is to store instructions read and executed by the CPU and/or other processors. Those skilled in the art will appreciate that main memory space (105) may be used to store various types of data.

In one or more embodiments of the invention, cache index aware allocator (115) is configured to manage the selection and/or creation of superblocks based on certain properties of the caches of processor (145). This is in contrast to modern virtual memory dynamic storage allocators (DSA) (e.g. those underlying common memory allocation and deallocation routines such as malloc and free), which do not take into account properties of processor caches. Specifically, no attempt is made by DSAs to disperse (i.e. place) allocations over the range of available indices in, for example, a first ($1^{st}$) level data cache (L1) (e.g. cache A (146)). Therefore, using cache oblivious allocators, a large number of live and frequently accessed memory allocations may map to and/or be placed on a small subset of the available cache indices (e.g. the indices of cache A (146)), resulting in a relative allocation imbalance and disparity in the caches, with some indices of the cache being heavily subscribed and frequently accessed, and other cache indices used less frequently. The index of a cache is a unique number used to refer to the memory location within the cache. This may be, for example, an offset from the beginning memory address of the cache (e.g. 1, 2, 3, . . . ). Each data entry of a cache has a tag that contains the index of the data in main memory that has been cached. The data entries may also be called cache lines or cache blocks.

In one or more embodiments of the invention, the underutilization of fixed and scarce cache level resources may restrict the fraction of program data that can fit in the cache at any one time, increasing the cache conflict miss rate, and decreasing performance. In one or more embodiments of the present invention, cache index aware allocator (115) distributes allocations of memory in superblocks 1 (121) to M (130) more evenly over the set of available cache indices in caches such as cache A (146). This promotes a reduced conflict miss rate and better performance when accessing data in the cache. Thus, cache index aware allocator (115) allows memory allocations to be distributed more efficiently into a cache (e.g. cache A (146)).

In one or more embodiments of the invention, local heap 1 (120) is memory in main memory space (105), that is configured to store superblocks. A superblock is a data structure in local heap memory, containing blocks of memory. A superblock consists of a coloring zone (which may also be referred to as a color zone), a header, and an array of contiguous fixed size memory blocks of a given size class. A size class is an interval of sizes of memory. For example, sizes in the range of 33-48 bytes may map to one size class, and sizes in the range of 49-64 may map to the next larger size class. A size class may be referred to by its upper bound. The set of size classes of superblocks in local heap 1 (120) may form a compete partition of the set of possible allocation sizes. The set of all size classes may be referred to as the size class partition (SCP). The intervals in an SCP are disjoint (i.e. non-overlapping). A mapping operation between the size of an object that is to be allocated in a local heap and a size class of a superblock in the local heap may identify a unique and specific interval within which the requested size falls, and thus to what size class superblock the object should be allocated. Therefore a mapping quantizes an object size to a size class. A coloring zone is a variable length region in a superblock that allows the location of the blocks within the superblock to be offset by varying amounts of memory, as determined by the size of the coloring zone.

In one or more embodiments of the invention, a superblock of size class S consists of a variable length coloring zone, a small fixed-size superblock header, finally followed by a dense array of blocks, each of length S. If a superblock is located at virtual address B, then the blocks within the superblock will reside at addresses B+H+C+(n*S), where S is the size class superblock, H is the size of the superblock header, and C the size of the superblock coloring zone (i.e. the superblock's color). The variable length coloring zone provides for superblock coloring, which helps to avoid and/or reduce collisions between allocations in different size classes, therefore reducing the odds of inter-superblock intra size class conflicts.

In one or more embodiments of the invention, the superblock header contains a pointer to a last in first out (LIFO) free list of available blocks within that superblock. Using a LIFO policy may promote cache and TLB locality. A memory block (e.g., Block 1 (124), Block B (133)) consists of a header—a pointer to the enclosing superblock, padding to satisfy alignment constraints—and the data area of the block. All blocks in a superblock are of the same size class. The maximum step between adjacent size classes in the SCP is often configured to be 20%, thus constraining internal memory fragmentation to no more than 20% in the worst case. Superblocks are typically a multiple of the system page size and are allocated from the system with system commands (e.g. mmap).

In one or more embodiments of the invention, superblock 1 (121) contains coloring zone (122), header 0 (123), and blocks 1-P (i.e. (124)-(129)). Blocks (124)-(129) are all of the same size class, and are at memory locations within superblock 1 (121) as determined by the size of coloring zone (122). Superblock M (130) contains coloring zone (131), header A (132), and blocks B-Q (i.e. (133)-(138)). Blocks (133)-(138) are all of the same size class, and are at memory locations within superblock M (130) as determined by the size of coloring zone (131). Those skilled in the art will appreciate that superblocks may contain other data areas beyond those disclosed in superblock 1 (121) and superblock M (130). Further, various other local heaps beyond local heap 1 (120) (i.e. local heap N (140)) may contain superblocks.

Figure 2:
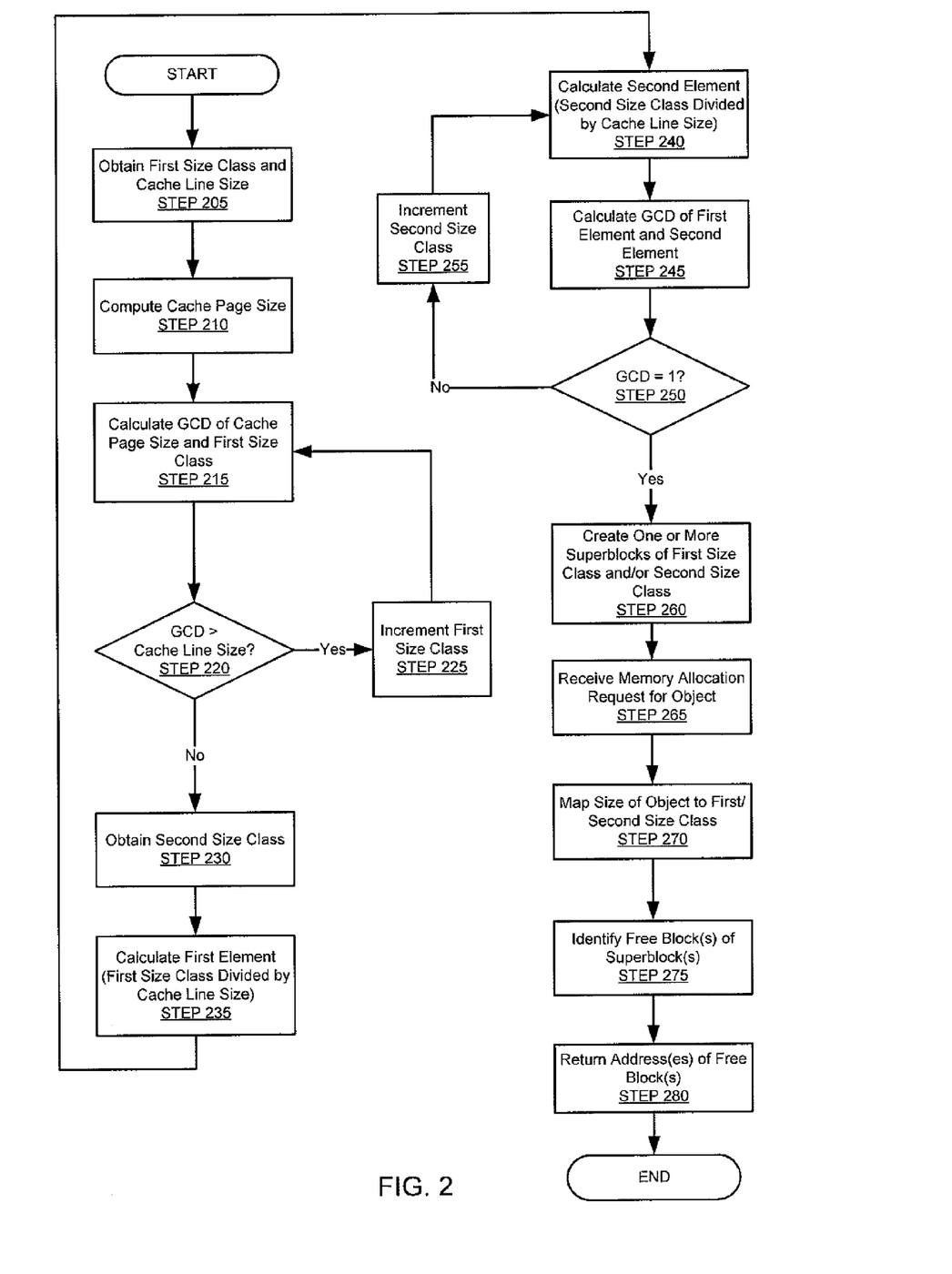
FIG. 2 shows a flowchart in accordance with one or more embodiments of the invention.

FIG. 2 shows a flowchart in accordance with one or more embodiments of the invention. The process shown in FIG. 2 may be used, for example, with system (100), to create one or more superblocks of a first and/or a second size class. The sequence of steps shown in FIG. 2 may differ among embodiments of the invention, and one or more of the steps may be performed in parallel and/or may be optional.

In STEP 205, a first size class and cache line size are obtained. The first size class may be a randomly generated number, a pre-loaded number provided by an operating system or another memory management application, or a number selected by a user. The cache line size corresponds to the size of each entry (e.g., typically 16 to 64 bytes) in a cache (e.g., Cache A (146)). In STEP 210, the cache page size for the cache is computed. The cache page size is computed by multiplying the number of entries in the cache by the cache line size.

In STEP 215, the greatest common denominator (GCD) of the cache page size and the first size class is calculated. In STEP 220, it is determined whether the GCD of the cache page size and the first size class is greater than the cache line size. If the GCD is greater than the cache line size, then the process proceeds to STEP 225, where in the first size class is incremented. Otherwise it proceeds to STEP 230.

In one or more embodiments of the invention, when the GCD of the cache page size and the first size class is high, there is a shorter cycle length (i.e. the number of elements in a cache that are allocated before allocation repeats elements) and a DSA is more prone to false index collisions and conflict misses. Formally, the cycle length of a size S is the cardinality of the cyclic subgroup generated by S. Therefore, when selecting the size-classes in the SCP, those sizes that have lower GCD values for the cache page size and the first size class may be considered better than those that have higher values for the GCD of the cache page size and the first size class.

In STEP 225, the first size class is incremented to select a better choice for the size class. In other words, after incrementing the first size class, the GCD of the cache page size and the incremented first size class may be less than or equal to the cache line size. This approach leaves an existing size class partitioning largely unchanged and establishes tight bounds on the internal fragmentation and wastage incurred by switching to a cache index aware size class partitioning from one that is cache index unaware. In this manner, the sizes in the SCP are "colored" to be cache index aware. Coloring of a size class refers to adjusting the size class by some increment to be cache index efficient. After the first size class is incremented, this updated first size class is used to re-calculate the GCD of the cache page size and the updated first size class, thus the process proceeds back to STEP 215.

In STEP 230, a second size class is obtained. The second size class may be a randomly generated number, a pre-loaded number provided by an operating system or another memory management application, or a number selected by a user.

In STEP 235, a first element is calculated. The first element is the first size class (or updated first size class, if it was incremented in STEP 225) divided by the cache line size. In STEP 240, a second element is calculated. The second element is the second size class divided by the cache line size.

In STEP 245, the GCD of the first element and the second element is calculated. In STEP 250, it is determined if the GCD of the first element and the second element is equal to 1. If the GCD of the first element and the second element is equal to 1, then the process proceeds to STEP 260, otherwise it proceeds to 255

While STEPS 205-225 relate to individual size class sizes and adjustments of those size class sizes as needed to promote better cache index distribution, STEPS 230-250 relate to another implementation that adjusts the entire set of sizes in the SCP to reduce cache index conflicts between superblocks of different size classes. For example, if size classes of 1000 bytes and 2000 bytes are selected, the indices of the memory blocks with sizes of 1000 bytes may coincide and/or collide with the indices of the memory blocks with sizes of 2000 bytes, creating artificial and unnecessary cache collisions. To avoid this problem, in addition to selecting individual size classes of size S to avoid intra-size-class conflicts as described in STEPS 205-225 (i.e., ensuring GCD(cache page size, S)≤cache line size), inter-size-class conflicts may also be reduced by minimizing pair-wise size-class conflicts with the SCP.

Specifically, the process may select the sizes in the SCP so that all possible size pairs of sizes $(S_x, S_y)$ in the SCP, where $S_x$ is not equal to $S_y$, have a GCD of a first element (i.e. $S_x$ divided by the cache line size) and a second element (i.e. $S_y$ divided by the cache line size) equal to 1 (i.e. GCD(($S_x$/cache line size), ($S_y$/cache line size))=1). More precisely, it is preferable to minimize the GCD of the first element and the second element (i.e. GCD(($S_x$/cache line size), ($S_y$/cache line size))) over the distinct size pairs within the SCP. Further, the cache index aware allocator can deliberately select size classes that are relatively prime integer multiples of the cache-line size.

In STEP 255, the second size class is incremented. This may be performed in order to reduce inter-size-class conflicts. For example, if the GCD of the first element and the second element is not equal to 1, the second size class may be considered a poor choice. In order to select a better choice for the second size class, it may be incremented by some value (e.g. 16). In other words, if the GCD of the first element and the second element is not equal to 1, then the GCD of the first element and the second element plus an increment may be equal to 1. After the second size class is incremented, this updated second size class is used to re-calculate the GCD of the first element and the updated second element, thus the process proceeds back to STEP 240.

In STEP 260, one or more superblocks of the first size class and/or the second size class are created. These superblocks are created with size classes that have been verified as being cache efficient. A cache index aware allocator may create the superblocks. The creation of a superblock includes allocating space within a local heap for the superblock, as well as the initiation of the individual elements of the superblock (i.e. a coloring zone, a header, and the memory blocks with the superblock). Those skilled in the art will appreciate that there may be various allocation and initiation mechanisms used by a cache index aware allocator to create superblocks in a local heap.

In STEP 265, a memory allocation request for an object is received. The memory allocation request for the object may be received from a program and/or process in the main memory space. The request may be received and/or managed by a cache index aware allocator.

In STEP 270, the size of the object is mapped to the first or second size class. This mapping is executed by identifying the smallest SCP exceeding the size of the object. For example, assume the first size class is smaller than the second size class. If the size of the object is less than or equal to the first size class, the object is mapped to the first size class. However, if the object is greater than the first size class and smaller than or equal to the second size class, the object is mapped to the second size class. The mapping may be performed by various means, including but not limited to the use of a function that accepts an object size as an input and outputs a size class, a mapping table, and a size class mapping data repository. Those skilled in the art will appreciate that there may be various other ways by which an object size is mapped to a size class.

In STEP 275, free blocks within one or more superblocks of the mapped size class (i.e., STEP 270) are identified. Free blocks are memory blocks (i.e. portions) that have not been allocated to another process and/or data.

In STEP 280, the addresses of the free blocks are returned. The addresses may be returned to the program and/or process that requested the memory allocation in STEP 265, for allocation of data by the program and/or process. A cache index aware allocator may return these addresses, and may manage future memory accesses of the blocks by the program and/or process.

Figure 3:
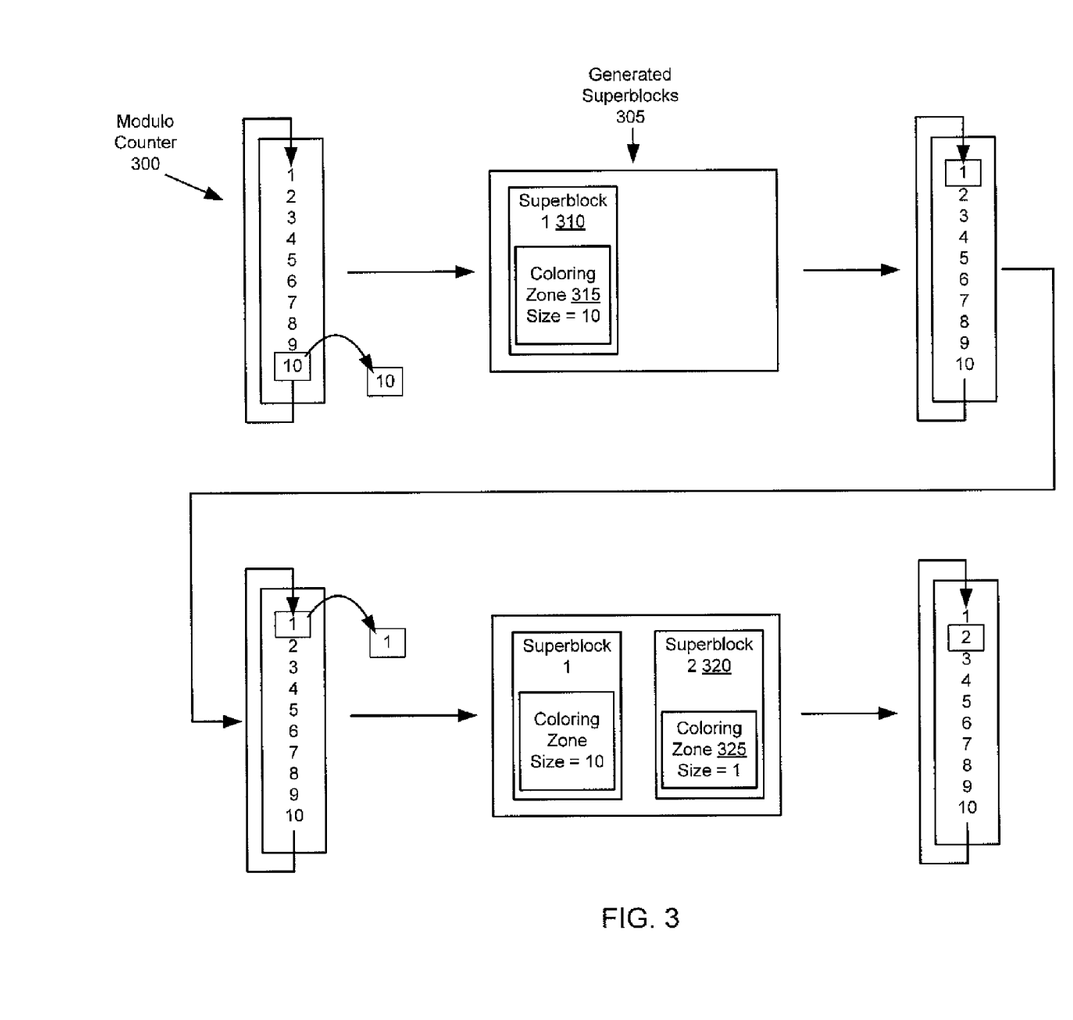
FIGS. 3-6 show examples in accordance with one or more embodiments of the invention.

FIG. 3 shows an example in accordance with one or more embodiments of the invention. The example shown in FIG. 3 may be used, for example, with system (100), to generate superblocks with coloring zone sizes determined by a modulo counter. Further, the sequence of steps shown in FIG. 3 may correspond to STEP 260, discussed above in reference to FIG. 2. The sequence of steps shown in FIG. 3 may differ among embodiments of the invention, and one or more of the steps may be performed in parallel and/or may be optional.

Initially, a value is obtained from modulo counter (300). Modulo counter (300) may be used as a basis for selection of color zone sizes when coloring superblocks, which may reduce the occurrences of inter-size-class conflicts. Specifically, a cache index aware allocator may maintain multiple "bins", each of which represents a free list of blocks that start on a given cache index. Therefore, each bin may correspond to a coloring zone size (e.g. 10 bytes). The cache aware allocator may randomly select a bin, or may use the modulo counter (300) to implement a round-robin scheme to attempt to distribute memory allocations evenly over the bins, which would result in a favorable cache index distribution. Therefore, modulo counter (300) may have a fixed number of values (e.g. 1-10), each representing a bin, and may iterate through these values one at a time upon each activation. Therefore, if modulo counter (300) has a value of 10 before activation, upon activation, it may provide this value to the requesting process, and increment by one in a modulo fashion (i.e. back to 1 if 10 is the last value).

Subsequently, in one or more embodiments of the invention, superblock 1 (310) is generated with coloring zone (315) of size=10. The value of 10 is obtained from modulo counter (300), in the attempt to spread superblock coloring uniformly across cache indices. Once superblock 1 (310) is generated, it becomes part of the generated superblocks (305) set.

In one or more embodiments of the invention, after the generation of superblock 1 (310), the value of modulo counter (300) is incremented. Specifically, it is incremented from its previous value of 10 to its current value of 1, in a modulo fashion. After incrementing the value of modulo counter (300), upon receiving a request to provide a value, modulo counter (300) may provide its current value, which is 1, to the requesting process. The requesting process may be the cache index aware allocator.

Next, in one or more embodiments of the invention, superblock 2 (320) is generated with coloring zone (325) of size=1. The value of 1 is obtained from modulo counter (300), once again in the attempt to spread superblock coloring uniformly across cache indices. Once superblock 2 (320) is generated, it becomes part of the generated superblocks (305) set.

Finally, in one or more embodiments of the invention, after the generation of superblock 2 (320), the value of modulo counter (300) is incremented again. In this case, the new value of modulo counter (300) may be 2. This is the value that it will provide to a process when a request for a value is received in the future.

Figure 4:
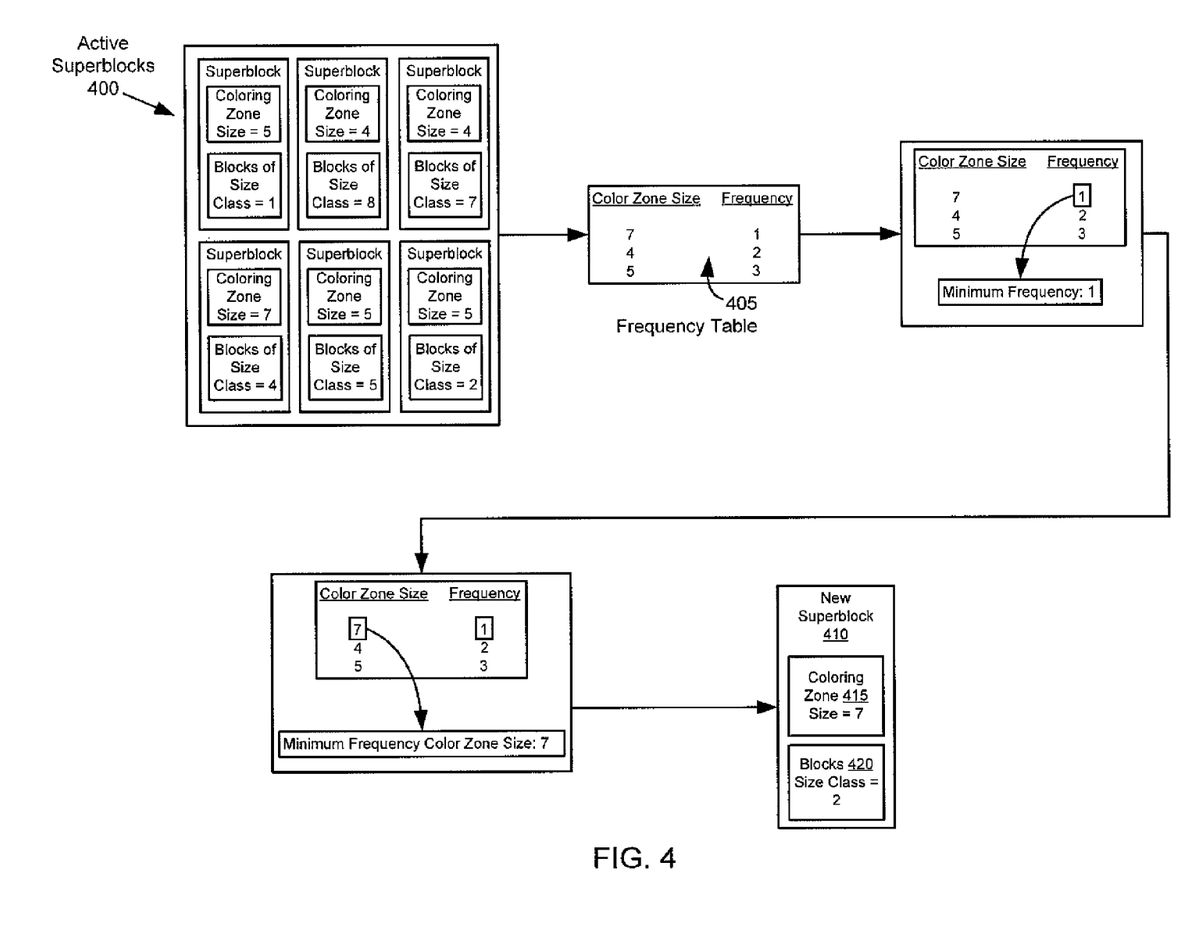

FIG. 4 shows an example in accordance with one or more embodiments of the invention. The example shown in FIG. 4 may be used, for example, with system (100), to create a superblock. The process shown in FIG. 4 selects the least frequently used coloring zone size to create the superblock. Further, the sequence of steps shown in FIG. 4 may correspond to STEP 260, discussed above in reference to FIG. 2. The sequence of steps shown in FIG. 4 may differ among embodiments of the invention, and one or more of the steps may be performed in parallel and/or may be optional.

In one or more embodiments of the invention, FIG. 4 describes a scenario in which a new superblock is created with a coloring zone size that is least used in the currently existing active superblocks. This mechanism (i.e. least used) is based on the premise that by creating superblocks of a least populated color, the memory blocks with a superblock of that color are unlikely to create cache conflicts with the memory blocks in other existing superblocks. This model presumes uniformly frequent access to a multitude of objects of a given size class. Such objects may be called "hot". Furthermore, it is assumed that only a few fields of such objects are frequently accessed (i.e. hot), while the other fields are cold and infrequently accessed. Such access patterns are typical in caches. The "least used" mechanism provides many of the benefits that may be achieved by using a fully associative cache. Fully associative caches are, however, expensive, as traditionally one address match comparator is required per cache line for full concurrency. Thus, the least used mechanism is a means to make caching of superblock data more efficient.

Initially, active superblocks (400) are identified. Active superblocks (400) may have various coloring zone sizes (e.g. 4, 5, and 7 bytes) and blocks of various size classes (e.g. 1, 2, 4, 5, 7 and 8 kilobytes). Active superblocks (400) are called "active" because the memory blocks in them are in use.

Subsequently the frequency table (405) is generated. Frequency table (405) contains a list of color zone sizes, and their frequencies, as obtained from active superblocks (400). For example, since there is one superblock with a coloring zone of size 7, the entry ("7", "1") may be found in frequency table (405). Similarly, since there are 2 superblocks with a coloring zone of size 4, the entry ("4", "2") may be found in frequency table (405). Finally, since there are 3 superblocks with a coloring zone of size 5, the entry ("5", "3") may be found in frequency table (405). Those skilled in the art will appreciate that there may be various mechanisms by which to calculate color zone sizes and frequencies of occurrence.

Next, in one or more embodiments of the invention, the minimum frequency in frequency table (405) is identified. This may be accomplished by, for example, iterating through the list of color zone sizes in frequency table (405), and selecting the color zone size with the smallest frequency value. In this case, frequency table (405) will select the minimum frequency of 1, corresponding to the color zone size of 7. By identifying the minimum frequency, the color zone size (e.g. 7) associated with that minimum frequency is also identified.

Finally, new superblock (410) is generated. New superblock (410) is generated with a color zone size equal to the minimum frequency color zone size previously identified. Thus, in this case, new superblock (410) is generated containing coloring zone (415) of size 7, as well as blocks (420) of size class 2. Those skilled in the art will appreciate that the least used mechanism may create superblocks with blocks of various sizes that are not necessarily determined by the minimum frequency color zone size.

In one or more embodiments of the invention, the color zone size of a superblock is set based on a random number generated by a random number generator. Multiple random generators may be used to set the color zone sizes of multiple superblocks. Further, each of the random number generators may be seeded with a different seed or the same seed.

Figure 5:
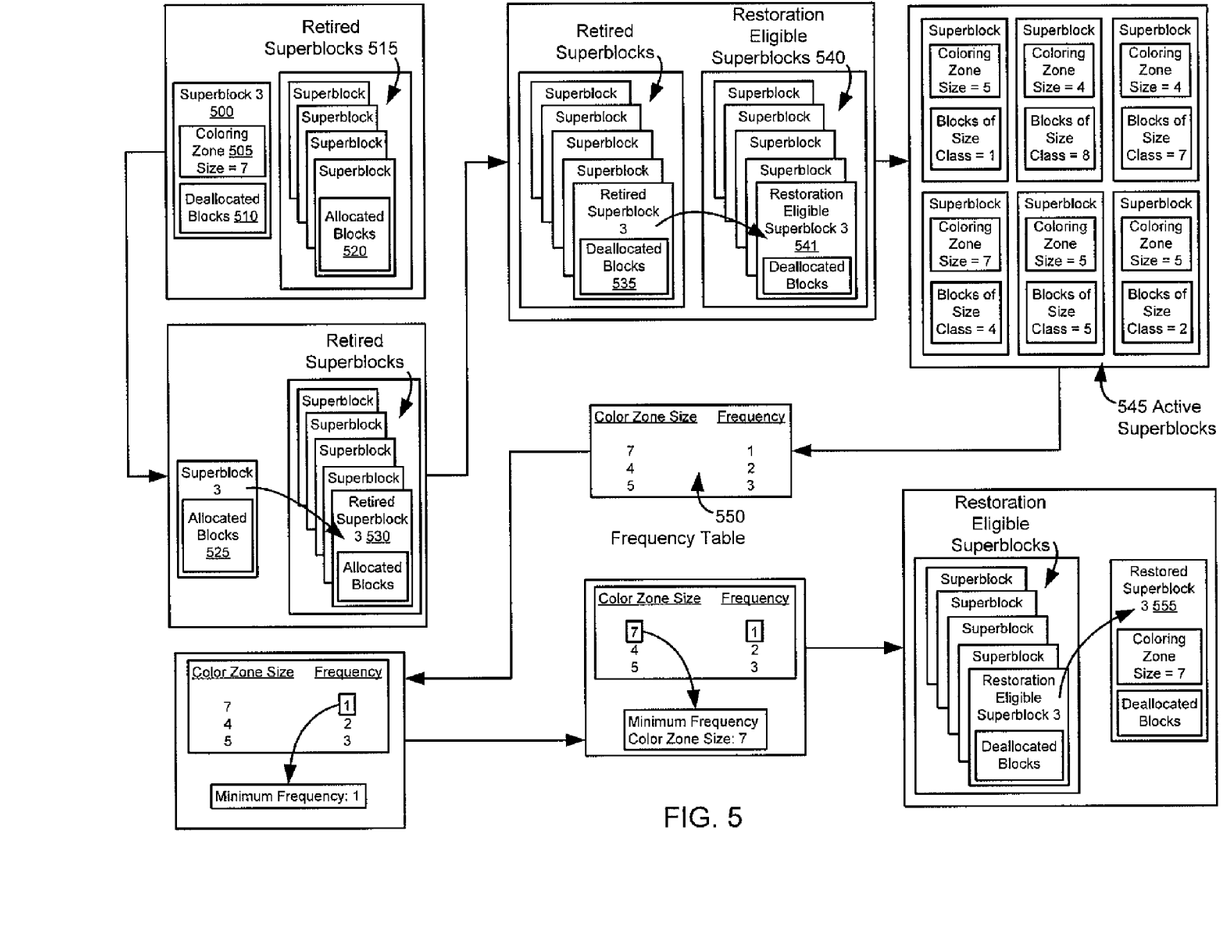

FIG. 5 shows an example in accordance with one or more embodiments of the invention. The example shown in FIG. 5 may be used, for example, with system (100), to restore superblocks from retirement based on a minimum frequency color zone size. The sequence of steps shown in FIG. 5 may differ among embodiments of the invention, and one or more of the steps may be performed in parallel and/or may be optional.

In one or more embodiments of the invention, FIG. 5 describes a scenario in which a superblock is retired, and then selected for restoration based on its color zone size using the least used scheme. When a superblock is exhausted (i.e. all of its blocks are allocated), the cache aware index allocator may retire the superblock (i.e. remove it from a list of superblocks available for allocation). If, at some time in the future, the fraction of available blocks in the retired superblock becomes higher than a predetermined restoration threshold, the retired superblock may be selected for restoration (i.e. placed back in the list of superblocks available for allocation). When selecting a retired superblock to restore to an available state and/or constructing a new superblock, the cache aware index allocator may check the population of existing active superblocks and select and/or create a superblock with a coloring that is different from all or the majority of the active superblocks. Further, when selecting a retired superblock to restore to an available state and/or constructing a new superblock, the cache aware index allocator may check the population of existing active superblocks and select and/or create a superblock with a coloring that is least used by the active superblocks.

Initially, in one or more embodiments of the invention, superblock 3 (500) and retired superblocks (515) are identified. Superblock 3 (500) has a coloring zone (505) of size 7, and deallocated blocks (510). Deallocated blocks are blocks that are not currently allocated. Retired superblocks (515) are part of a group of superblocks that have been allocated, and as such have allocated blocks (e.g. allocated blocks (520)).

Then, in one or more embodiments of the invention, superblock 3 (500) is added to retired superblocks (515). This occurs when the blocks of superblock 3 (500) are allocated to programs, processes, and/or data. Therefore, superblock 3 (500) now has allocated blocks (525), and becomes retired superblock 3 (530) in retired superblocks (515).

Subsequently, in one or more embodiments of the invention, at least one of allocated blocks (525) is deallocated in retired superblock 3 (530). Upon the deallocation of one or more blocks (e.g. deallocated blocks (535)) of retired superblock 3 (530), this superblock becomes restoration eligible superblock 3 (541), which is placed into the set of restoration eligible superblocks (540).

Next, in one or more embodiments of the invention, active superblocks (545) are identified. Active superblocks (545) include various superblocks of various color zone sizes (e.g. 4, 5, 7), containing blocks of various size classes (e.g. 1, 2, 4, 5, 7, 8). These superblocks are currently active (i.e. they may have been allocated and are in use).

Next, in one or more embodiments of the invention, frequency table (550) is generated. Frequency table (550) contains a list of color zone sizes, and their frequencies, as obtained from active superblocks (545). For example, since there is one superblock with a coloring zone of size 7, the entry ("7", "1") may be found in frequency table (550). Similarly, since there are 2 superblocks with a coloring zone of size 4, the entry ("4", "2") may be found in frequency table (550). Finally, since there are 3 superblocks with a coloring zone of size 5, the entry ("5", "3") may be found in frequency table (550). Those skilled in the art will appreciate that there may be various mechanisms by which to calculate color zone sizes and frequencies of occurrence of color zone sizes.

Subsequently, in one or more embodiments of the invention, a minimum frequency of frequency table (550) is identified. This may be accomplished by, for example, iterating through the list of color zone sizes in frequency table (550), and selecting the color zone size with the smallest frequency value. In this case, frequency table (550) will select a minimum frequency of 1, corresponding to the color zone size of 7. By identifying the minimum frequency, the color zone size (e.g. 7) associated with that minimum frequency (i.e. the minimum frequency color zone size) is also identified.

Finally, in one or more embodiments of the invention, restoration eligible superblock 3 (541) is selected from restoration eligible superblocks (540) for restoration in response to the size of the color zone of restoration eligible superblock 3 (541) equaling the size of the identified minimum frequency color zone size. Therefore, restoration eligible superblock 3 (541) becomes restored superblock 3 (555), because it contains a coloring zone of size 7. In this manner, restored superblock 3 (555) is restored to use and may be available for allocation because it has a least used color zone size. In addition to restoring retired superblocks, this mechanism may also be applied to the creation of new superblocks. Those skilled in the art will appreciate that there may be various other scenarios in which the least used mechanism may be applied, and various other ways in which retired superblocks may be restored.

Figure 6:
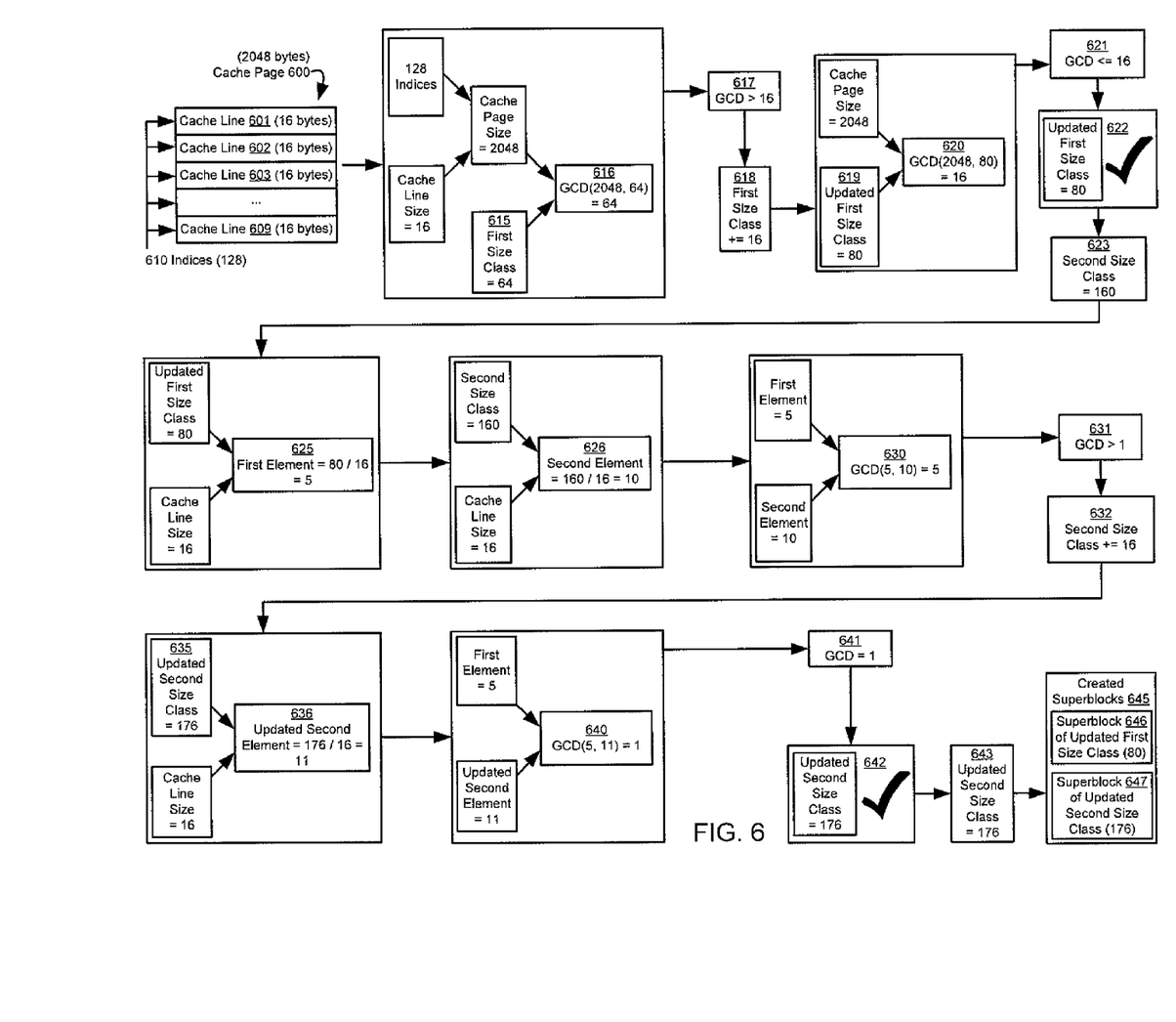

FIG. 6 shows an example in accordance with one or more embodiments of the invention. The example shown in FIG. 6 may be used, for example, with system (100), to create superblocks that are cache efficient. The sequence of steps shown in FIG. 6 may differ among embodiments of the invention, and one or more of the steps may be performed in parallel and/or may be optional.

Initially, cache page (600) is identified. Cache page (600) contains 128 indices (610), and cache lines (601)-(609) that are each 16 bytes in size.

Next, a cache page size is computed. The cache page size is the total size of cache page (600). This may be calculated by multiplying the number of indices (i.e. 128) by the size of each cache line (i.e. 16 bytes) to compute a cache page size of 2048 bytes.

Next, first size class (615) is obtained. First size class (615) may be obtained from a superblock that has been selected as a potential template for the creation of other superblocks. In this case, first size class (615) is equal to 64.

Next, GCD (616) of the cache page size and the first size class is calculated. The GCD of the cache page size (i.e. 2048) and the first size class (615) (i.e. 64) equals 64 (i.e. GCD (2048, 64)=64).

Next, it is determined that the GCD of the cache page size and the first size class is greater than the cache line size (See 617). Since the computed GCD equals 64, which is greater than the cache line size of 16, the first size class may be considered as unsuitable for selection.

Next, the first size class is incremented by 16 bytes (See 618). Therefore, the updated first size class is now equal to 80. This calculation is performed in order to generate a potentially more suitable size class candidate, which may then be tested for suitability.

Next, GCD (620) of the cache page size and the updated first size class (first size class (619)) is calculated. The GCD of the cache page size (i.e. 2048) and the updated first size class (619) (i.e. 80) equals 16 (i.e. GCD (2048, 80)=16).

Next, it is determined that the GCD of the cache page size and the updated first size class is less than or equal to than the cache line size 16 (See 621). Therefore, the updated first size class (i.e. with a size of 80) is accepted as a suitable size class candidate (See 622).

Next, second size class (623) is identified. Second size class (623) may be obtained from a superblock that has been selected as a potential template for the creation of other superblocks. Alternatively, the second size class may be selected by a random number generator. In this case, second size class (623) is equal to 160.

Next, first element (625) is calculated. The first element is the updated first size class (i.e. 80) divided by the cache line size (i.e. 16). Thus, first element (625) equals 5 (i.e. 80/16=5).

Next, second element (626) is calculated. The second element is the second size class (i.e. 160) divided by the cache line size (i.e. 16). Thus, second element (626) equals 10 (i.e. 160/16=10).

Next, GCD (630) of the first element (i.e. 5) and the second element (i.e. 10) is calculated. Thus, GCD (630) equals 5 (i.e. GCD (5, 10)=5).

Next, it is determined that the GCD of the first element and the second element is greater than 1 (See 631). Since the computed GCD equals 5, which is greater than 1, the second size class may be considered as unsuitable.

Next, the second size class is updated by incrementing it by 16 bytes (See 632). Therefore, the updated second size class is now equal to 176. The second class size is incremented in order to generate a potentially more suitable size class candidate. The suitability of this updated class size is tested by re-performing the GCD calculation of the first element and the updated second element.

Next, updated second element (636) is calculated. The updated second element is the updated second size class (635) divided by the cache line size. Therefore, updated second element (636) equals 11 (i.e. 176/16=11).

Next, GCD (640) of the first element and the updated second element is calculated. This is a re-calculation of the GCD based on an updated second element (and the updated second size class). Therefore, GCD (640) of the first element (i.e. 5) and the updated second element (i.e. 11) equals 1 (i.e. GCD(5, 11)=1).

Next, it is determined that the GCD of the first element and the updated second element is equal to 1 (See 641). Since the computed GCD equals 1, the updated second size class is deemed suitable (See 642).

Finally, in one or more embodiments of the invention, since updated second size class (643) is accepted, updated first size class (619) and updated second size class (643) are used to create superblocks of the updated first size class and the updated second size class. Specifically, created superblocks (645) are generated including superblocks (646) of the updated first size class and superblocks (647) of the updated second size class. The coloring zone size of the new superblocks may be selected using any of the processes described in FIG. 3 or FIG. 4 (e.g., randomly selected sizes, round-robin scheme, least frequently used scheme, etc.).

In one or more embodiments of the invention, after the creation of created superblocks (645), a memory allocation request for an object may be received, a size of the object may be mapped to the updated first or updated second size class, free blocks of either the updated first or updated second size classes of one or more superblocks are identified, and the addresses of the free blocks are returned to the entity that requested the memory allocation. Those skilled in the art will appreciate that there may be various other mechanisms by which cache efficient superblocks may be created.

Figure 7:
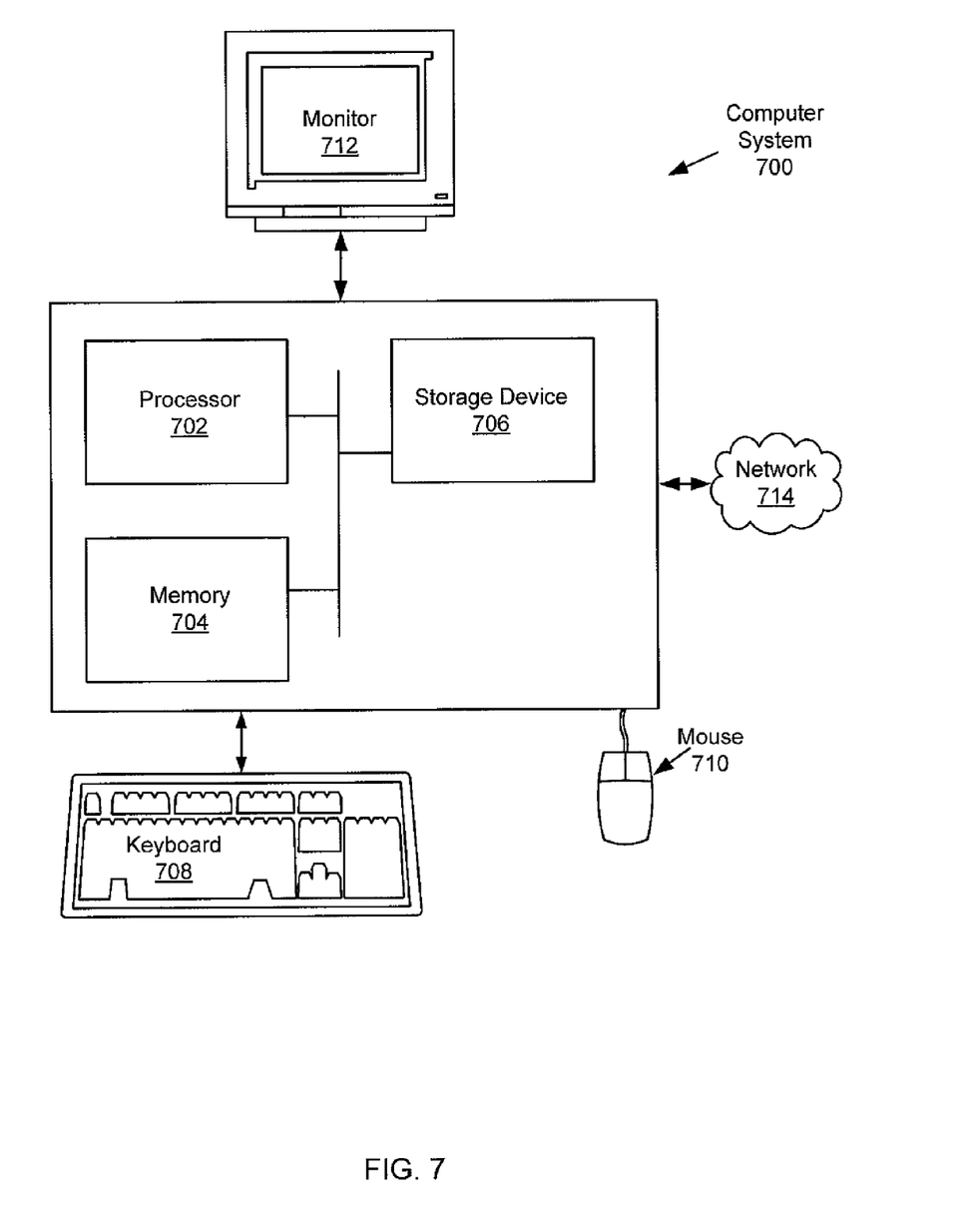
FIG. 7 shows a computer system in accordance with one or more embodiments of the invention.

Embodiments of the invention may be implemented on virtually any type of computer regardless of the platform being used. For example, as shown in FIG. 7, computer system (700) includes one or more processor(s) (702), associated memory (704) (e.g. random access memory (RAM), cache memory, flash memory, etc.), storage device (706) (e.g. a hard disk, an optical drive such as a compact disk drive or digital video disk (DVD) drive, a flash memory stick, etc.), and numerous other elements and functionalities typical of today's computers (not shown). In one or more embodiments of the invention, processor (702) is hardware. For example, the processor may be an integrated circuit. Computer system (700) may also include input means, such as keyboard (708), mouse (710), or a microphone (not shown). Further, computer system (700) may include output means, such as monitor (712) (e.g. a liquid crystal display (LCD), a plasma display, or cathode ray tube (CRT) monitor). Computer system (700) may be connected to network (714) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention (e.g. cache index aware allocator, local heap, cache) may be located on a different node within the distributed system.

In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a computer readable medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a memory, comprising:
    obtaining a first size class;
    obtaining a number of indices and a cache line size of a cache memory;
    computing a cache page size by multiplying the number of indices by the cache line size;
    calculating a greatest common denominator (GCD) of the cache page size and the first size class;
    incrementing, in response to the GCD of the cache page size and the first size class exceeding the cache line size, the first size class to generate an updated first size class;
    calculating a GCD of the cache page size and the updated first size class;
    creating, in response to the GCD of the cache page size and the updated first size class being less than the cache line size, a first superblock in the memory comprising a first plurality of blocks of the updated first size class;
    creating a second superblock in the memory;
    receiving a memory allocation request (MAR) for an object having a size;
    mapping, in response to the MAR, the size of the object to the updated first size class;
    identifying, in response to mapping the size of the object to the updated first size class, a free block of the first plurality of blocks in the first superblock; and
    returning, in the response to the memory allocation request, an address of the free block.

2. The method of claim 1, further comprising:
    seeding, within a first process, a first random number generator with a first seed;
    generating, by the first random number generator, a first random number;
    setting a color zone size of the first superblock based on the first random number;
    seeding, within a second process, a second random number generator with a second seed;
    generating, by the second random number generator, a second random number; and
    setting a color zone size of the second superblock based on the second random number.

3. The method of claim 1, further comprising:
    identifying a plurality of superblocks of the updated first size class having a plurality of color zone sizes;
    determining a plurality of frequencies of the plurality of color zone sizes;
    identifying a minimum frequency of the plurality of frequencies;
    identifying a color zone size corresponding to the minimum frequency; and
    setting a size of a color zone of the first superblock to the color zone size.

4. The method of claim 1, further comprising:
    identifying a plurality of superblocks of a plurality of size classes having a plurality of color zone sizes;
    determining a plurality of frequencies of the plurality of color zone sizes;
    identifying a minimum frequency of the plurality of frequencies;
    identifying a color zone size corresponding to the minimum frequency; and
    setting a size of a color zone of the first superblock to the color zone size.

5. The method of claim 1, further comprising:
    identifying a first value from a modulo counter;
    setting a color zone size of the first superblock to the first value;
    incrementing the modulo counter;
    identifying a second value from the modulo counter after incrementing the modulo counter; and
    setting a color zone size of the second superblock to the second value.

6. The method of claim 1, further comprising:
    adding a third superblock comprising a plurality of allocated blocks to a plurality of retired superblocks;
    deallocating at least one of the plurality of allocated blocks after adding the third superblock to the plurality of retired superblocks;
    transferring, in response to deallocating, the third superblock to a plurality of restoration eligible superblocks;
    obtaining a value from a modulo counter; and
    selecting the third superblock from the plurality of restoration eligible superblocks for restoration in response to a color zone size of the third superblock equaling the value.

7. The method of claim 1, further comprising:
    adding a third superblock comprising a plurality of allocated blocks to a plurality of retired superblocks;
    deallocating at least one of the plurality of allocated blocks after adding the third superblock to the plurality of retired superblocks;
    transferring, in response to deallocating, the third superblock to a plurality of restoration eligible superblocks;
    determining a plurality of frequencies of a plurality of color zone sizes of a plurality of active superblocks;
    identifying a minimum frequency of the plurality of frequencies;
    identifying a color zone size corresponding to the minimum frequency; and
    selecting the third superblock from the plurality of restoration eligible superblocks for restoration in response to a size of a color zone of the third superblock equaling the color zone size.

8. The method of claim 1, further comprising:
    obtaining a second size class;
    calculating a first element by dividing the first size class by the cache line size;
    calculating a second element by dividing the second size class by the cache line size;
    calculating a GCD of the first element and the second element;
    incrementing, in response to the GCD of the first element and the second element exceeding 1, the second size class to generate an updated second size class;
    calculating an updated second element by dividing the updated second size class by the cache line size;

calculating a GCD of the first element and the updated second element; and setting, in response to the GCD of the first element and the updated second element equaling 1, a second plurality of blocks of the second superblock to the updated second size class.

9. A system for managing a memory, comprising:
a processor;
a cache memory executing on the processor and comprising a number of indices and a cache line size;
a local heap in a main memory space comprising a plurality of superblocks of a first size class; and
a cache index aware allocator in the main memory space, executing on the processor, and configured to:
 obtain the first size class;
 obtain the number of indices and the cache line size of the cache memory;
 compute a cache page size by multiplying the number of indices by the cache line size;
 calculate a greatest common denominator (GCD) of the cache page size and the first size class;
 increment, in response to the GCD of the cache page size and the first size class exceeding the cache line size, the first size class to generate an updated first size class;
 calculate a GCD of the cache page size and the updated first size class;
 create, in response to the GCD of the cache page size and the updated first size class being less than the cache line size, a first superblock in the local heap comprising a first plurality of blocks of the updated first size class;
 create a second superblock in the local heap;
 receive a memory allocation request (MAR) for an object having a size;
 map, in response to the MAR, the size of the object to the updated first size class;
 identify, in response to mapping the size of the object to the updated first size class, a free block of the first plurality of blocks in the first superblock; and
 return, in the response to the memory allocation request, an address of the free block.

10. The system of claim 9, wherein the cache index aware allocator is further configured to:
 identify a plurality of superblocks of the updated first size class having a plurality of color zone sizes;
 determine a plurality of frequencies of the plurality of color zone sizes;
 identify a minimum frequency of the plurality of frequencies;
 identify a color zone size corresponding to the minimum frequency; and
 set a size of a color zone of the first superblock to the color zone size.

11. The system of claim 9, wherein the cache index aware allocator is further configured to:
 add a third superblock comprising a plurality of allocated blocks to a plurality of retired superblocks;
 deallocate at least one of the plurality of allocated blocks after adding the third superblock to the plurality of retired superblocks;
 transfer, in response to deallocating, the third superblock to a plurality of restoration eligible superblocks;
 obtain a value from a modulo counter; and
 select the third superblock from the plurality of restoration eligible superblocks for restoration in response to a color zone size of the third superblock equaling the value.

12. The system of claim 9, wherein the cache index aware allocator is further configured to:
 add a third superblock comprising a plurality of allocated blocks to a plurality of retired superblocks;
 deallocate at least one of the plurality of allocated blocks after adding the third superblock to the plurality of retired superblocks;
 transfer, in response to deallocating, the third superblock to a plurality of restoration eligible superblocks;
 determine a plurality of frequencies of a plurality of color zone sizes of a plurality of active superblocks;
 identify a minimum frequency of the plurality of frequencies;
 identify a color zone size corresponding to the minimum frequency; and
 select the third superblock from the plurality of restoration eligible superblocks for restoration in response to a size of a color zone of the third superblock equaling the color zone size.

13. The system of claim 9, wherein the cache index aware allocator is further configured to:
 obtain a second size class;
 calculate a first element by dividing the first size class by the cache line size;
 calculate a second element by dividing the second size class by the cache line size;
 calculate a GCD of the first element and the second element;
 increment, in response to the GCD of the first element and the second element exceeding 1, the second size class to generate an updated second size class;
 calculate an updated second element by dividing the updated second size class by the cache line size;
 calculate a GCD of the first element and the updated second element; and
 set, in response to the GCD of the first element and the updated second element equaling 1, a second plurality of blocks of the second superblock to the updated second size class.

14. A non-transitory computer readable medium storing instruction for managing a memory, the instructions executable on a processor and comprising functionality for:
 obtaining a first size class;
 obtaining a number of indices and a cache line size of a cache memory;
 computing a cache page size by multiplying the number of indices by the cache line size;
 calculating a greatest common denominator (GCD) of the cache page size and the first size class;
 incrementing, in response to the GCD of the cache page size and the first size class exceeding the cache line size, the first size class to generate an updated first size class;
 calculating a GCD of the cache page size and the updated first size class;
 creating, in response to the GCD of the cache page size and the updated first size class being less than the cache line size, a first superblock in the memory comprising a first plurality of blocks of the updated first size class;
 creating a second superblock in the memory;
 receiving a memory allocation request (MAR) for an object having a size;
 mapping, in response to the MAR, the size of the object to the updated first size class;
 identifying, in response to mapping the size of the object to the updated first size class, a free block of the first plurality of blocks in the first superblock; and returning, in the response to the memory allocation request, an address of the free block.

15. The computer readable medium of claim 14, the instructions further comprising functionality for:
   seeding, within a first process, a first random number generator with a first seed;
   generating, by the first random number generator, a first random number;
   setting a color zone size of the first superblock based on the first random number;
   seeding, within a second process, a second random number generator with a second seed;
   generating, by the second random number generator, a second random number; and
   setting a color zone size of the second superblock based on the second random number.

16. The computer readable medium of claim 14, the instructions further comprising functionality for:
   identifying a plurality of superblocks of the updated first size class having a plurality of color zone sizes;
   determining a plurality of frequencies of the plurality of color zone sizes;
   identifying a minimum frequency of the plurality of frequencies;
   identifying a color zone size corresponding to the minimum frequency; and
   setting a size of a color zone of the first superblock to the color zone size.

17. The computer readable medium of claim 14, the instructions further comprising functionality for:
   identifying a plurality of superblocks of a plurality of size classes having a plurality of color zone sizes;
   determining a plurality of frequencies of the plurality of color zone sizes;
   identifying a minimum frequency of the plurality of frequencies;
   identifying a color zone size corresponding to the minimum frequency; and
   setting a size of a color zone of the first superblock to the color zone size.

18. The computer readable medium of claim 14, the instructions further comprising functionality for:
   adding a third superblock comprising a plurality of allocated blocks to a plurality of retired superblocks;
   deallocating at least one of the plurality of allocated blocks after adding the third superblock to the plurality of retired superblocks;
   transferring, in response to deallocating, the third superblock to a plurality of restoration eligible superblocks;
   obtaining a value from a modulo counter; and
   selecting the third superblock from the plurality of restoration eligible superblocks for restoration in response to a color zone size of the third superblock equaling the value.

19. The computer readable medium of claim 14, the instructions further comprising functionality for:
   adding a third superblock comprising a plurality of allocated blocks to a plurality of retired superblocks;
   deallocating at least one of the plurality of allocated blocks after adding the third superblock to the plurality of retired superblocks;
   transferring, in response to deallocating, the third superblock to a plurality of restoration eligible superblocks;
   determining a plurality of frequencies of a plurality of color zone sizes of a plurality of active superblocks;
   identifying a minimum frequency of the plurality of frequencies;
   identifying a color zone size corresponding to the minimum frequency; and
   selecting the third superblock from the plurality of restoration eligible superblocks for restoration in response to a size of a color zone of the third superblock equaling the color zone size.

20. The computer readable medium of claim 14, the instructions further comprising functionality for:
   obtaining a second size class;
   calculating a first element by dividing the first size class by the cache line size;
   calculating a second element by dividing the second size class by the cache line size;
   calculating a GCD of the first element and the second element;
   incrementing, in response to the GCD of the first element and the second element exceeding 1, the second size class to generate an updated second size class;
   calculating an updated second element by dividing the updated second size class by the cache line size;
   calculating a GCD of the first element and the updated second element; and
   setting, in response to the GCD of the first element and the updated second element equaling 1, a second plurality of blocks of the second superblock to the updated second size class.

* * * * *

UNITED STATES PATENT AND TRADEMARK OFFICE
CERTIFICATE OF CORRECTION

PATENT NO.         : 8,707,006 B2                                          Page 1 of 1
APPLICATION NO.    : 12/899493
DATED              : April 22, 2014
INVENTOR(S)        : Dice It is certified that error appears in the above-identified patent and that said Letters Patent is hereby corrected as shown below:

In the Specification

In column 6, line 24, after "255" insert -- . --.

Signed and Sealed this
Twenty-third Day of September, 2014

Michelle K. Lee
*Deputy Director of the United States Patent and Trademark Office*